United States Patent [19]

Carey

[11] Patent Number: 4,995,647
[45] Date of Patent: Feb. 26, 1991

[54] PORTAL SEMICYLINDRICAL ELECTRICAL CONNECTOR

[75] Inventor: Kevin Carey, Philadelphia, N.Y.
[73] Assignee: John Mr. & Mrs. Carey, West Stockholm, N.Y.
[21] Appl. No.: 384,980
[22] Filed: Jul. 26, 1989
[51] Int. Cl.⁵ .............................................. F16L 3/04
[52] U.S. Cl. .................................. 285/161; 285/325; 285/404; 174/65 R
[58] Field of Search ............... 285/161, 205, 206, 325, 285/121, 128, 404, 129; 403/195, 196; 174/65 R

[56] References Cited

U.S. PATENT DOCUMENTS

| | | | |
|---|---|---|---|
| 834,684 | 10/1906 | Sibley et al. | 285/161 |
| 1,677,628 | 7/1928 | Gould | 285/161 |
| 1,904,409 | 4/1933 | Church | 285/161 |
| 2,084,967 | 6/1937 | Bondeson | 285/161 X |
| 2,341,112 | 2/1944 | Merrell | 285/161 X |

Primary Examiner—Dave W. Arola
Attorney, Agent, or Firm—Schmeiser, Morelle & Watts

[57] ABSTRACT

A threaded cylinder frame ending at a flange ring and extending in a semicylindrical half sleeve for attachment to another semicylindrical half sleeve. A Locknut with barbs secures and grounds the cylinder frame to the service box wall, and a janus flange ring prevents the connector from passing through the box wall and the pipe from passing through the connector to the box wiring. The length of the half sleeves accommodate random environment movement and retain the pipe within the conduit system. The removable half sleeve allows the pipe to be laid on the catchment area of the main half sleeve and a portal to be formed between the end of the pipe and the flange ring, permitting inspection and repair of wiring.

3 Claims, 2 Drawing Sheets

PORTAL SEMICYLINDRICAL ELECTRICAL CONNECTOR

FIELD OF THE INVENTION

This invention relates to electrical pipe, conduit and box connectors; and, more particularly a connection between an electric box or relay point and the carrying pipe for laid wire.

BACKGROUND OF THE INVENTION

With devices presently in use the pipe carrying the electrical wires insert into a bottom receptacle and then forced into an upper sleeve which is secured to the electrical box. The pipe is then moved upwardly approximately one half the distance into the upper sleeve and one half the distance out of the lower receptacle. Set screws through the lower receptacle and upper sleeve are tightened to secure the pipe therein. If the pipe is not positioned accurately enough the set screws may engage with the pipe too near the pipe end thereby collapsing the pipe and damaging the wires therein. Even if the wires are not damaged immediately the collapsed pipe end creates a sharp edge which will strip any wires moving through the pipe.

Inspection of the pipe placement to assure that all contacts are positioned correctly requires removal of the pipe. Thus, when returned to the receptacle and sleeve all of the same errors are possible and the inspection is for naught. Thus, inspectors commonly do not review these types of connections and potentially dangerous errors go unnoticed.

The portal semicylindrical connector of the subject invention relates to the field of electrical wiring and conduits and provides: easier installation, inspection and maintenance; prevention of personal harm by commercial and private users; protection of wiring within service areas and conduits; and, integral conduit system strengthening by use of an unique internal/external janus-flange.

Previously, a number of inventions have been made in the field of pipes and conduits which address the objects of catchment and securing of conduit connectors. In a patent issued to Carney, in 1904, U.S. Pat. No. 771,709, an invention was presented that offered two semicylindrical unattached halfs which could be joined by use of a screwdown collar. This connection with collar invention had the objects of preserving the integrity of the joint and of attachment and remoVal, With repair opportunity at point of coupling. In 1927, U.S. Pat. No. 1,650,233 was issued to Plunkett, which displayed two hollow half boxes fastened together by bolts, forming a corner box connector for a wiring conduit that changes direction. As with the Carney invention, the Plunkett design required unfastening two independent halfs, one of which would be removed while the other could be held in place by hand or other holding means. Further, the Plunkett invention intended that the interior box space would hold a slackened area of wire and provide a working area for service repair.

A coupling variation by Merrel in 1944, U.S. Pat. No. 2,341,112, presented an inverted T-box connection where the T separated flexible wiring armor. A single clamping mechanism secured the wiring armor against the T-crossbar and directed its entry into the hollow T-stanchion. Similar to the Plunkett invention, Merrel's object was removal of the clamping mechanism for entry into the T-intersection, but unlike Plunkett who intended repair, Merrel's priority was on multiple insertions of additional flexible armor cables/wires. Still, the Merrel design was like both the Carney and Plunkett in utilizing two independent pieces to create the fastening mechanism.

An invention by Sixt, U.S. Pat. No. 3,471,179 displayed a coupling adaptor that offered an easy-to-use and reliable attachment It permitted flexible corrugated tubing to be coupled by with the invention's plurality of annular raised ribs, where the tapered end of the adaptor would provide a male fit into the corrugated tubing up to the point where the corrugated ridges would form a connecting seal with the tapered adaptor's similar ridges. While Sixt's invention was able to address the advantages presented by corrugated materials by offering a time-saving and easy-to-use coupler, some of the coupling objects of the prior art were sacrificed: the ability to remove an independent section in order to make repairs or to insert additional cabling. Removing Sixt's adaptor for these sacrificed advantages would mean the required application of an entirely new adaptor or corrugated tubing, whichever was more delicate, or in some circumstances, the replacement of both adaptor and tubing. Consequently, this meant the repair of the conduit system as well as the wiring or cabling system.

An invention by Hollaender, U.S. Pat. No. 3,069,189, incorporated several of the prior art advantages by introducing a pipe connector of the split sleeve type. Two semicylindrical half sleeves, cut along the longitudinal line, offered a connector best embodied as a coupling T, where one part of the T is a section of piping and the other part of the T is to two half sleeves, one of which is integrally molded to the T. The other half sleeve is an independent section of the coupling which is fastened by channelled tie wings and set screws. The entire Hollaender invention is designed for the two advantages of installation and strengthening of the conduits.

These prior inventions were limited by their applications. For example, the Sixt invention is best embodied by an application which is intended to be permanent and which provides a drainout from the pipe system. As such, it is not expected to be subject to removal for repair of the conduit interior nor subject to withstand either pipe movement pressures.

The inventions by Carney and Plunkett were both simple inventions of similar halfs being held together by fasteners. With Carey, the two semicylindrical sleeves were held over the to-be-secured joint, and a fastening collar was threaded onto the halfs, thereby securing the joint. Plunkett's invention had in the preferred embodiment an electrical corner or redirection connection, where the elbow connection was achieved by a longitudinally-cut hollow box. Two halfs of the box were held together over the area to be protected and fastened together by a plurality of bolts and the piping connected to the box.

Merrel's invention advanced the art by offering a clamping mechanism, itself shaped to hold flexible armor cables to the crossbar of an inverted, hollowed T enclosure. The achievement in holding the clamped armored cables, however, emphasized the object of introducing additional cabling when needed. Again, my invention is not designed merely to hold in place, neither only for protection as in the prior art nor for clamping redirected cables as in the Merrel variation.

The objects of the Hollaender invention are apparent from the preferred embodiments and for which it was designed: joining two or more pipes which extend or cross angularly. One half of the Hollaender connector is an integrally molded short pipe with half sleeve, where the short pipe serves as an extension of one of the two main pipe systems which angularly cross. The second pipe is laid in place over the half sleeve of the connector, and the second pipe is secured to the connector by the other half sleeve and fastened by channelled tie wings and set screws.

Also, more than simply feeding the wiring into a new Pipe or service area, my invention supports and strengthens the piping system interface with a unique interior/exterior janus-flange. This prevents intrusion by a shifting pipe into the service area itself, thereby avoiding property damage and personal harm that comes from electrical system fraying, shorts, exposed wire, etc.

These prior inventions fail to disclose the several advantages contained in the portal semicylindrical connector, and none display the janus-flange or portal features of the instant invention. My invention is designed as an interior electrical conduit connector which strengthens the integrity of the conduit system by displaying an interior/exterior janus-flange preventing a structural system collapse whereby a connected pipe impinges the interior of the contiguous service box/area. With the janus-flange, a pipe which exceeds pressing tolerance on the service box either cracks the portal connector causing the pipe end to be directed away from the box entrance/knot hole or the pipe itself cracks and again the pipe end is turned aside.

The portal feature carries numerous advantages including: decreased time for installation; reduced space requirements for service; increased safety for property protection and personal harm prevention. The very design of the portal carries these advantages. During installation, the main cylindrical frame is attached to the service box, and the pipe end is laid on the concave catchment of the main semicylindrical half sleeve. The wiring system is then secured by the fastening of the dependent semicylindrical half sleeve. During service and maintenance, the portal dependent sleeve is removed allowing access for inspection, fishtaping, and repair; thereby eliminating the need for space and labor for pipe movement. Safety is increased by: a reduction in the need for major body movement; a reduction in body strain during movement of the pipe; a reduction in wire strain from detachment and separation of conduit; ease of system maintenance by non-professionals and homeowners.

Still other discrete features and combined features make my invention an important contribution to the field, as well as contributing to still other related activities as: trade school instruction; hauling and carrying of piping; and, construction.

SUMMARY OF THE INVENTION

Industry experience demonstrates damage to the wires and during installation, repair, inspection, and from earth and building movements. The wires thereby lose the protection which the pipes were designed to affect and these very protection means themselves add to the damage. The pipe end, becomes, even when undamaged, the impairing and harming object, stripping an/or cutting the wires thereby losing power and placing persons and material at risk.

The instant invention contemplates the use of a connector banded at an externally threaded base by a janus-flange, and extending back from the base in two semicylindrical sections, one of which is detachable. My invention conforms to standard electrical wiring conduit connectors, permitting connection with electrical service box/areas and pipes. One end of the portal semicylindrical half sleeve connector is externally threaded for screw insertion in an electrical service box.

At the base of the threaded tracks the connector widens into a smooth exterior flange ring, which in turn forms a backstop for the detachable semicylindrical section and for an internally threaded ring locknut movable along the threaded tracks. The locknut is designed with spiral arms which taper back into a series of barbs. The barbed design makes the nut amenable to gross digital manipulation during installation and maintenance. It also allows finger tightening to sufficiently press the barbs into the wall of the electrical service box/area. The tightening pressure anchors the connector to the service box/area.

The ringed flange is also part of the interior design of the connector. While sufficiently wide for wire passage, the interior ring flange is of similar thickness as the pipe to be inserted into the connector. The pipe will abut the ring forming a relatively smooth inner wall and covering the sharp ends of the pipe preventing wire stripping. The ring also constricts the passageway as a further safety backstop during conduit collapse, thereby causing a redirection of the pipe away from the box knot hole or entry port. Thus, this janus-ring, interiorly and exteriorly, protrudes to prevent respectively the attached pipe from passing through the connector and the connector from passing through the service box. Thus, the connector acts to ground, restrain, and redirect.

Extending back from the flange ring is an integrally molded semicylindrical half sleeve, extending longitudinally along the line of the attached pipe. Both the interior and exterior of the sleeve are machined for smoothness and strength, and the length and width of the sleeve is a function of the fitting requirements of the attaching pipe. If the semicylindrical half sleeve is more than 1.5 inches long two set screws should be used. Generally the sleeve will be of a width to handle pipes one half to six inches in diameter. At the longitudinal cut of the sleeves, the sleeve side turns outward at the 90 degree, whereby a line drawn connecting the opposing sides of the sleeve at the point of the 90 degree turn is the diameter of a completed circle, 180 degrees of which is formed by the integrally molded half sleeve. The outward turning sleeve forms warding ridges which extend the length of the half sleeve from the flange ring to sleeve end, presenting a uniform shape from flange to end.

The dependent half sleeve is semicylindrical, having the same contemplated radius and length as the main integrally molded half sleeve. At the longitudinal cut of the sleeve, the sides also turn outward at the 90 degree. Each side extends out to a point just beyond that which is measured by the warding ridges of the main half sleeve, at which point the dependent half sleeve side turns 180 degrees and extends back on a parallel. Thus, the dependent half sleeve displays tie wings with bracketed slots which exactly fit the ridges of the main half sleeve.

In order to secure this fit, a set screw is utilized. A hole is machined midway along the length of the dependent half sleeve, and midway on the arc from cornered side to cornered side. Viewed from the interior of the half sleeve, the hole commences from the concave side, threads through the half sleeve, and emerges from a protruding circular wall crest. Viewed from the exterior of the half sleeve, the lip of the crest is machined for a smooth roll from the top end of the inner-threaded orifice over and out to the smooth outer semicylindrical surface of the half sleeve. A flat head screw threads the semicylindrical half sleeve from the crest through the semicylindrical plate and comes to contact with the attaching pipe. Tightening the screw against the pipe counter forces the half sleeve away from the pipe. In turn, the removable half sleeve's tie wings are forced laterally against the warding ridges of the main half sleeve.

During installation, the connector is easily screwed to the service box, and the attaching pipe is laid onto the main half sleeve catchment. This negates the straining and fraying of wires leading from pipe to box; whether the damage results from sharp pipe end shavings or from difficult handling. Instead, with the pipe laid on the catchment sleeve, attention can be directed to installation and wire connection. The proper placement of the pipe can be viewed, inspected and connected because of the design of the half sleeve. The removable half sleeve is then placed over the conduit, the tie wings aligned with the other sleeve's ridges, and the removable sleeve is slid along the ridges until it contacts with the base of the flange ring. The set screw is then tightened, securing the connector to the attaching pipe, and the full attachment is complete.

Since the base of the flange ring is machined for smoothness, the wires can be retracted while in contact with the connector without added steps for wire protection and personal safety. Only simple tape covering would be required for covering of the attached pipe end, without which fraying to wires or misdirected current could occur during wire retraction. Thus, the connector results in substantial commercial savings: in time for installation and maintenance; in needed space and equipment for maintenance and repair; in energy for conduit connection, disconnection, and reconnection; and in labor during inspection and maintenance.

Additionally, the connector provides an automatic installation aid for both the professional and residential user. Since an object of the connector is the prevention of undue intrusion of the attaching pipe into the service box, the interior flange ring is an automatic stop for the attaching pipe end. Also, less care has to be directed to the condition of the pipe end, either for shavings, sharpness, or even cut. Further, the piping can be measured and cut at the installation point without the need for circular measurements or banding tools.

With the decreased steps and effort needed for installation, inspection and maintenance, increased personal safety results. Not only is safety a result from the integrity of the wiring system which requires less wiring strain and fraying, but safety results from the decreased labor steps needed. Overall personal safety and property protection is also increased by introducing the janus-flange both to strengthen the conduit system during random environmental movements and for breakaway during conduit collapse.

DETAILED DESCRIPTION OF THE PREFERRED EMBODIMENT

Figure 1:
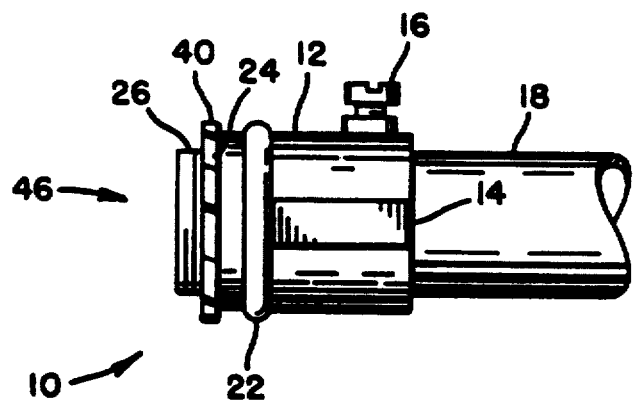
FIG. 1 is a side elevational view of the invention, with connector assembled and attached to pipe.

With reference to FIG. 1, there is depicted in side elevational view of the invention 10, the removable half sleeve 12 and the mail cylindrical frame 46. The main frame 46 consists of an open necked and threaded cylinder 26, an exterior flange ring 22, and an extending semicylindrical half sleeve 20. The removable half sleeve 12 is designed to extend from the base of the exterior flange ring 22 along the longitudinal line of the pipe and ending at the same point as the end of the main half sleeve.

At the longitudinal boundaries of the removable half sleeve, the sides turn outward to form tie wings 14, which attach the two half sleeves together as an exterior securing and protective cover of the pipe end. A screw 16 threads through the removable half sleeve 12, presses against the pipe 18 and counter forces the half sleeve 12 away from the pipe 18. The pipe 18 retains the relative position of the main half sleeve 20 firmly in place, and, as the removable half sleeve 12 is counter forced away from the pipe 18, the sleeve 12 is also forced away from the main half sleeve 20. However, the sleeves are held together by the tie wings 14.

Figure 5:
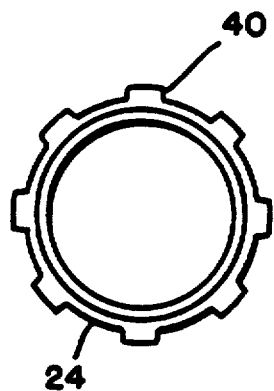
FIG. 5 is partial cross-sectional view of connector with locknut.
Figure 6:
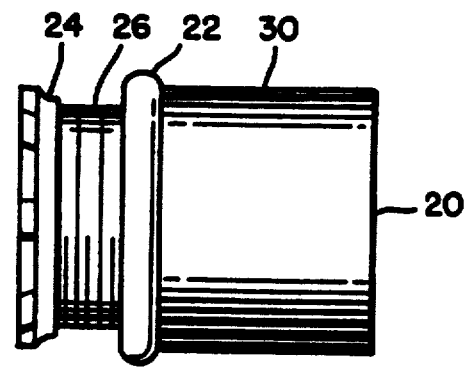
FIG. 6 is side elevational view of connector with locknut screwed to engage service box.

At the open necked and threaded end 26 of the main cylindrical frame 46, the electrical connector 10 utilizes a threaded locknut 24 which screws onto the threaded end of cylinder 26. FIG. 6 is a convex side elevational view of the main cylindrical frame which displays the locknut 24 counterturned to the end of the electrical connector 10, and which makes contact with and presses against a connecting electrical service box/area. In FIG. 5, the locknut is seen in cross-section and displays a spinning sun with spiral arms which taper into a series of barbs 40. The barbs 40 come into contact with the electrical service box when the locknut is counterturned as displayed in FIG. 6, and, thus, the barbs create both a grounding for the current and a securing of the connector to the service box.

Figure 2:
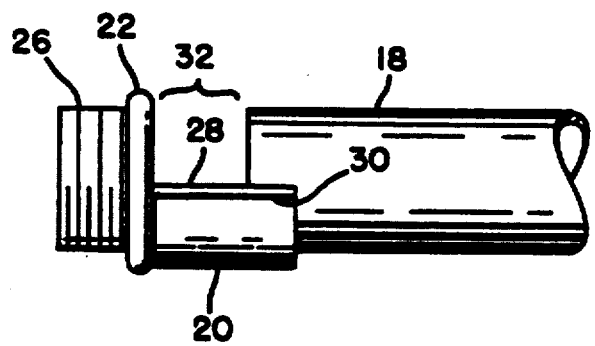
FIG. 2 is a side elevational view of pipe laid onto catchment sleeve.

When the connector is attached to the service box/area, the attaching pipe 18 can be laid onto the concave catchment 28 of the cylindrical half sleeve, as displayed in FIG. 2 with the exception that the pipe is cut to fit snugly into the catchment and abutting the interior flanging ring 36. The abutment is viewed through the portal space 32, FIGS. 2 and 3. The interior flange ring 36 is machined for smoothness thereby permitting significant pulling of the wiring up through the connector without fraying or cutting by shavings and sharp edges of the ring, or the pipe end.

Figure 3:
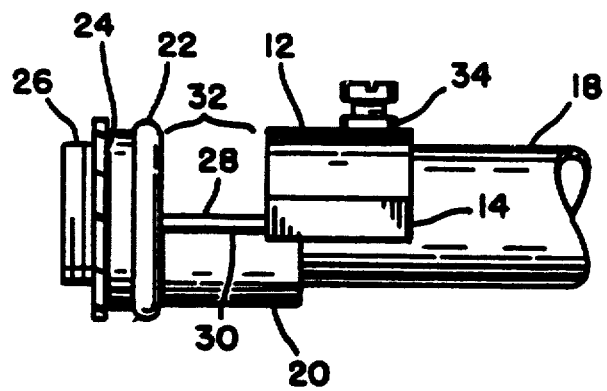
FIG. 3 is a side elevational view of removeable sleeve drawn back to discover wiring portal.
Figure 4:
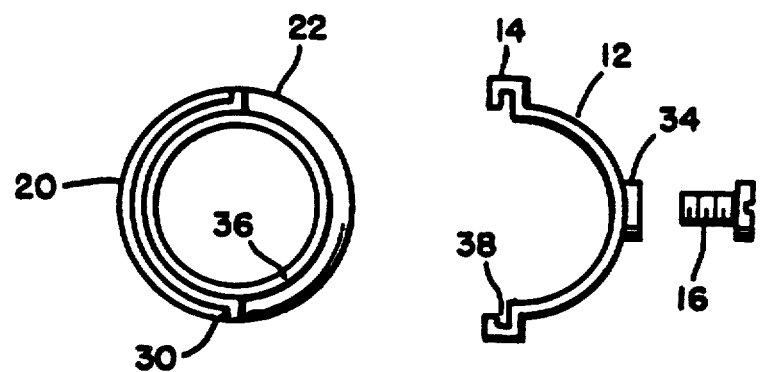
FIG. 4 is exploded cross-sectional orthogonal view of connector half sleeves and flat head screw.

FIG. 3 displays the positioning of the removable half sleeve 12 in a complementary position to the main cylindrical half sleeve 20, so as to complete a circle fit at point of contact. In FIG. 4, an exploded cross-sectional view discloses the bracketed and slotted tie wings 14 at the length-side perimeter of the removable half sleeve 12. In isometric, FIG. 4 also presents the complementarily fitted warding ridges 30 of the cylindrical half frame. FIG. 3 shows the removable half sleeve 12 drawn back from the flange ring 22, exposing the portal 32 and the end of the pipe 18. FIG. 1 displays the closed position, wherein the tie wings 14 are drawn forward along the warding ridges 30 until contact with the flange ring 22. FIG. 4 displays the fit of the main sleeve's ridges 30 with the bracketed slots 38 of the removable sleeve's tie wings.

Screw 16 enters the side crest 34 of removable half sleeve 12. Fully turned, the screw 16 makes contact with the pipe 18 away from the end and presses the pipe against the concave interior of main cylindrical sleeve 20. Securing means is achieved by this screw pressure. Random environmental movement which shifts the conduit system is compensated by the connector's design. FIG. 4 displays an interior flange ring 36 with sufficient passage for wiring yet of a more constricted diameter than the attached pipe 18 to restrain the pipe 18 from entering the service box/area and perhaps more importantly to serve as an abutment for the pipe 18 so that a smooth interior is formed along the pipe, the connector and into the electrical box. FIGS. 2 and 3 display the catchment means of the main half sleeve 20 with sufficient length to retain capture of an outward shifting pipe 18.

Multiple embodiments can be appreciated by a practitioner in the field. For example, polygonal shaped half sleeves could fit similar piping designed in turn to accommodate select cables or wires and provide additional securing means. Also, the length of the catchment sleeve could be extended for additional strength, and with multiple screws or securing means applied. Further, the half sleeves could receive abutting support, from either the service wall or expanded flange, at a point along the sleeve.

It should be appreciated that the actual construction of the electrical connector may be constructed with a variety of materials and in a number of embodiments. Thus the scope of the invention should be determined by the appended claims rather than by the alternates provided.

What I claim is:

1. An electrical cover connector for securing a pipe to an electrical box comprising:

a unitary one piece main cylindrical frame having at one end an externally threaded cylinder for screw like insertion into the electrical box, about the base of said externally threaded cylinder and unitary therewith is a flange ring, the exterior of which extends above the externally threaded cylinder and serves as a backstop for the main frame when said frame is secured into the electrical box, the flange having an interior ring of similar thickness to the pipe such that said pipe will abut the interior ring preventing entry of the pipe into the externally threaded cylinder and forming a relatively smooth inner wall between and along the pipe and the interior flange ring, extending back from the flange ring and integral therewith is a semicylindrical half sleeve for receiving the pipe which will lie in the half sleeve and may abut the interior ring, said half sleeve of the main frame having means for receiving a detachable semicylindrical half sleeve;

a detachable semicylindrical half sleeve removably securable to said main frame semi-cylindrical half sleeve for enclosing the pipe within said half sleeves, the exterior of the flange also serving as a backstop to prevent forward movement of the detachable half sleeve toward the externally threaded cylinder, said detachable half sleeve being removable from the main frame without detaching said externally threaded cylinder from the electrical box for inspection of the connection without replacement of the pipe or reconnection of the main frame; and means for securing the half sleeves together and means for securing the pipe within said half sleeves.

2. The invention of claim 1 further comprising an internally threaded barbed lock knot sized to rotatably engage the external threading on said cylinder.

3. The invention of claim 1 wherein said means for securing said main frame semicylindrical half sleeve and said removable half sleeve together includes a slidable engagement therebetween and said means for securing the pipe within said half sleeves includes at least one set screw through one of said half sleeves for securing the pipe therein and locking the main frame semicylindrical half sleeve and the removable half sleeve in relation to one another.

* * * * *